(12) United States Patent
Eckerstorfer et al.

(10) Patent No.: US 9,108,234 B2
(45) Date of Patent: Aug. 18, 2015

(54) METHOD AND APPARATUS FOR PREPARING STEEL STOCK BEFORE HOT ROLLING

(75) Inventors: Gerald Eckerstorfer, Leonding (AT); Gerald Hohenbichler, Kronstorf (AT); Bernd Linzer, Leombach (AT)

(73) Assignee: SIEMENS VAI METALS TECHNOLOGIES GMBH (AT)

( * ) Notice: Subject to any disclaimer, the term of this patent is extended or adjusted under 35 U.S.C. 154(b) by 86 days.

(21) Appl. No.: 14/118,443

(22) PCT Filed: May 16, 2012

(86) PCT No.: PCT/EP2012/059132
§ 371 (c)(1),
(2), (4) Date: Nov. 18, 2013

(87) PCT Pub. No.: WO2012/159955
PCT Pub. Date: Nov. 29, 2012

(65) Prior Publication Data
US 2014/0096578 A1 Apr. 10, 2014

(30) Foreign Application Priority Data

May 20, 2011 (EP) .................................... 11166823

(51) Int. Cl.
*B21B 1/26* (2006.01)
*B21C 43/00* (2006.01)
(Continued)

(52) U.S. Cl.
CPC ... *B21B 1/26* (2013.01); *B21B 1/46* (2013.01); *B21B 15/005* (2013.01); *B21B 38/00* (2013.01);
(Continued)

(58) Field of Classification Search
CPC ............ B21C 43/00; B21B 1/26; B21B 1/46; B21B 15/005; B21B 38/00; B21B 38/06; B21B 45/06; B21B 45/08; B21B 45/004; B21B 37/74; B21B 2261/20; C21D 8/02; C21D 9/561; C21D 6/60; F27B 9/067; F27B 19/04
See application file for complete search history.

(56) References Cited

U.S. PATENT DOCUMENTS

| | | | |
|---|---|---|---|
| 5,307,864 A | 5/1994 | Arvedi | |
| 5,697,241 A * | 12/1997 | Djumlija et al. | 72/39 |

(Continued)

FOREIGN PATENT DOCUMENTS

| | | |
|---|---|---|
| CN | 1625447 | 6/2005 |
| CN | 101010153 | 8/2007 |
| CN | 101272873 | 9/2008 |
| CN | 101304819 | 11/2008 |
| CN | 101484593 | 7/2009 |
| WO | WO 2008/000396 A1 | 1/2008 |
| WO | WO 2010115698 | 10/2010 |
| WO | WO 2010115698 A1 | 10/2010 |
| WO | WO 2010121763 | 10/2010 |
| WO | WO 2011009819 | 1/2011 |

OTHER PUBLICATIONS

Giovanni Arvedi et al. "Latest results from the Arvedi ISP technology and prospects for the new ISP-ECR technology", XP-001159537, Stahl und Eisen 123 (2003) No. 3, pp. 57-65.

*Primary Examiner* — David B Jones
(74) *Attorney, Agent, or Firm* — Ostrolenk Faber LLP

(57) ABSTRACT

A process and an apparatus for preparing steel stock before hot rolling. The steps of preheating the stock (5, 16, 22) in a first induction furnace (6) so that the preheated stock enters a subsequent descaling apparatus (7) with a surface temperature of $T_1 \geq 1000°$ C.; descaling the preheated stock by a plurality of water jets in a descaling apparatus (7); direct subsequent heating of the descaled stock in a second induction furnace (8), where the descaled stock enters the second induction furnace (8) at a temperature $T_2$ which is $\geq T_{curie}$ of the stock and heating in the second induction furnace 8 is either in a largely inert or largely reducing protective gas atmosphere; passing the heated stock in a rolling mill (9), where the heated stock enters the rolling mill (9) at a temperature $1220°$ C. $\geq T_3$ $1050°$ C.

8 Claims, 3 Drawing Sheets

(51) Int. Cl.

| | |
|---|---|
| *B21B 38/00* | (2006.01) |
| *B21B 45/06* | (2006.01) |
| *B21B 15/00* | (2006.01) |
| *B21B 1/46* | (2006.01) |
| *C21D 8/02* | (2006.01) |
| *C21D 9/56* | (2006.01) |
| *C21D 9/60* | (2006.01) |
| *F27B 9/06* | (2006.01) |
| *F27B 19/04* | (2006.01) |
| *B21B 45/08* | (2006.01) |
| *B21B 45/00* | (2006.01) |

(52) U.S. Cl.
CPC ............... *B21B 38/006* (2013.01); *B21B 45/06* (2013.01); *B21B 45/08* (2013.01); *B21C 43/00* (2013.01); *C21D 8/02* (2013.01); *C21D 9/561* (2013.01); *C21D 9/60* (2013.01); *F27B 9/067* (2013.01); *F27B 19/04* (2013.01); *B21B 45/004* (2013.01); *B21B 2261/20* (2013.01)

(56) References Cited

U.S. PATENT DOCUMENTS

| | | | |
|---|---|---|---|
| 7,357,011 | B2 | 4/2008 | Rittner et al. |
| 7,854,884 | B2 | 12/2010 | Schuster et al. |
| 8,479,550 | B2 * | 7/2013 | Eckerstorfer et al. ............ 72/202 |
| 8,950,227 | B2 * | 2/2015 | Hohenbichler et al. ........ 72/12.2 |
| 2007/0113610 | A1 | 5/2007 | Altuntop et al. |
| 2008/0276679 | A1 | 11/2008 | Eckerstorfer |
| 2010/0147484 | A1 | 6/2010 | Hackenberg et al. |
| 2010/0212856 | A1 | 8/2010 | Benfer et al. |
| 2010/0218911 | A1 | 9/2010 | Chen et al. |
| 2012/0067095 | A1 | 3/2012 | Hohenbichler et al. |

* cited by examiner

METHOD AND APPARATUS FOR PREPARING STEEL STOCK BEFORE HOT ROLLING

CROSS-REFERENCE TO RELATED APPLICATIONS

The present application is a 35 U.S.C. §§371 national phase conversion of PCT/EP2012/059132, filed May 16, 2012, which claims priority of German Patent Application No. 11166823.2, filed May 20, 2011, the contents of which are incorporated by reference herein. The PCT International Application was published in the German language.

BACKGROUND OF THE INVENTION

1. Technical Field

The present invention relates to a method for preparing steel rolling stock prior to hot rolling, comprising the steps of preheating the rolling stock, descaling the preheated rolling stock, heating the descaled rolling stock, and finally hot rolling the rolling stock itself.

The invention further relates to an apparatus for preparing steel rolling stock prior to hot rolling, comprising a first furnace for preheating the rolling stock, a descaling device for descaling the preheated rolling stock, a second furnace for heating the descaled rolling stock, and finally a rolling mill for hot rolling the heated rolling stock itself.

2. Prior Art

A combined casting/rolling plant for producing silicon steel is known from WO 2008/000396 A1, wherein the rolling stock is heated in a roller hearth furnace, subsequently descaled, heated in an induction furnace to a temperature greater than the rolling temperature, subsequently descaled a second time, and finally hot-rolled.

What is disadvantageous about this method for preparing the rolling stock is that the roller hearth furnace is poor at adapting to rapidly changing operating conditions, e.g. to the casting speeds at startup and shutdown time of the plant, that the rolling stock must be descaled twice, and that the descaled rolling stock must be heated in the induction furnace to a temperature significantly higher, typically up to 100° C. higher, than the rolling temperature before it can be hot-rolled. The method is therefore complicated and labor-intensive, and above all inefficient in energy terms; moreover, the plant is also complex and extensive in its overall installation length.

SUMMARY OF THE INVENTION

The object of the invention is to overcome the disadvantages of the prior art and find an energy-efficient method and a compact apparatus for preparing rolling stock by means of which the rolling stock can be reliably heated in an energy-efficient manner and is nonetheless thoroughly descaled even at transient, rapidly changing speeds.

This object is achieved by a method comprising the following method steps of:
preheating the rolling stock in a first induction furnace such that the preheated rolling stock enters a downstream descaling device at a surface temperature $T_1 \geq 1000°$ C., preferably $T_1 \geq 1050°$ C.; subsequently
descaling the preheated rolling stock by means of a plurality of water jets in the descaling device; immediately subsequently
heating the descaled rolling stock in a second induction furnace, the descaled rolling stock entering the second induction furnace at a rolling stock temperature $T_2 \geq T_{Curie}$, preferably $T_2 \geq 900°$ C., and the descaled rolling stock being heated in the second induction furnace in either a largely inert or a largely reducing protective gas atmosphere; immediately subsequently
hot rolling the heated rolling stock in a rolling mill with at least three rolling passes, the heated rolling stock entering the rolling mill at a temperature $1220° C. \geq T_3 \geq 1050°$ C.

The rolling stock can be either a cast product, e.g. with slab, thin slab, billet or bloom cross-section, or a rolled flat or long product, e.g. a so-called rough strip or rough strand. Often the rolling stock is already a pre-rolled product that has been produced in a roughing stand or roughing stand group.

According to the invention, the rolling stock is preheated in a first induction furnace, which may have (though this is not mandatory) an inert or reducing protective gas atmosphere, to a temperature $T_1 > 1000°$ C., preferably $T_1 > 1050°$ C., such that the preheated rolling stock enters the downstream descaling device at a surface temperature $T_1 > 1000°$ C., thereby ensuring thorough descaling of the rolling stock. If the preheated rolling stock has a temperature $> 1050°$ C., then the rolling stock will be descaled even more thoroughly, since the scale is subjected to a thermal shock in addition to the momentum of the pulsed water jets. Descaling by means of the descaling device, which typically consists of a plurality of individual descaling units (e.g. single nozzles or nozzle rotors) distributed in each case on the top and bottom side over the width dimension of the rolling stock, ensures that the rolling stock enters the second induction furnace with a very thin scale film, the temperature of the rolling stock in the second induction furnace being constantly higher than the so-called Curie temperature $T_{Curie}$ (approx. 770° C. in the case of iron or steel) of the rolling stock. Above $T_{Curie}$, the rolling stock loses its ferromagnetic or ferroelectric properties, thereby ensuring a constant permeability of the rolling stock during the heating process. It has been demonstrated that in particular the power electronics of high-performance induction furnaces can be damaged below or during the phase transition of a ferromagnetic rolling stock in its paramagnetic high-temperature form, whereas this is reliably prevented in the case of the method according to the invention. As a result of the descaled rolling stock being heated in the second induction furnace, which has either a largely inert or a largely reducing protective gas atmosphere, the rolling stock is brought to the rolling temperature $T_3$ without a substantial additional scale layer being produced in the process. Finally, the heated and descaled rolling stock is hot-rolled in a rolling mill, the rolling stock entering the (typically multistand) rolling mill at a temperature between 1050° C. and 1220° C. Owing to the once-only descaling, the method according to the invention is characterized by a high degree of energy efficiency, with the result that e.g. in a QSP plant the heat taken up in the tunnel furnace is retained, so the rolling stock requires only a small amount of additional preheating or heating, and above all because the rolling stock only has to be descaled once, since the second induction furnace is operated with a largely inert or largely reducing protective gas atmosphere.

The two-stage heating of the rolling stock, i.e. the preheating in the first induction furnace and the heating in the second induction furnace, has the great advantage that two different process parameters can be optimally set independently of each other. Firstly, an optimal setting of the steel-quality-dependent descaling temperature is possible; secondly, the hot rolling is performed at an optimal temperature, with in particular the so-called final rolling temperature, i.e. the temperature during the final rolling pass, being dependent on the number of rolling passes, the throughput and the overall reduction in thickness.

In a particularly energy-efficient embodiment, the preheated rolling stock is descaled by means of a plurality of rotating water jets, each issued from a rotor of a rotary descaling device. With this arrangement, scale is removed from the rolling stock by a plurality of rotating water jets of a rotary descaler that are obliquely directed against the surface of the hot strip, the water in the descaler having e.g. a pressure of between 200 and 420 bar.

From the energy perspective it is particularly advantageous if the descaled rolling stock enters the second induction furnace at a temperature >900° C. so that on the one hand the rolling stock is cooled only a little as a result of the descaling and on the other hand it also has to be heated only to a limited degree in the either largely inert or largely reducing protective gas atmosphere in the second induction furnace. This embodiment is characterized by particularly high energy efficiency.

For a consistently high descaling effect as well as for a high level of energy efficiency it is advantageous for the temperature $T_1$ of the preheated rolling stock to be measured by means of a temperature measuring instrument prior to the descaling and to be supplied to a controller; it is likewise advantageous for the controller to determine a control variable with the aid of a control law and taking into account a reference temperature $T_{1\ Ref}$ and supply same to a control element, wherein at least one inductor of the first induction furnace is driven in such a way that the temperature $T_1$ of the preheated rolling stock corresponds as closely as possible to the reference temperature $T_{1\ Ref}$. In this case the temperature measuring instrument can be embodied e.g. as a pyrometer or a thermal camera, thereby enabling contactless measurement of the temperature of the rolling stock.

According to a further advantageous embodiment, a temperature profile $T_1$ of the preheated rolling stock is measured by means of a temperature profile measuring instrument prior to the descaling and supplied to a controller; with the aid of a control law and taking into account a reference temperature profile $T_{1\ Ref}$ the controller determines a control variable and supplies same to a control element, with at least one inductor of the first induction furnace being driven such that the temperature profile $T_1$ of the preheated rolling stock corresponds as closely as possible to the reference temperature profile $T_{1\ Ref}$. In this case the temperature profile can be a vector of discrete temperatures, for which reason the temperature profile is shown printed in bold. A particularly uniform temperature distribution in the rolling stock and therefore a consistently high level of performance in descaling the rolling stock can be achieved by means of this embodiment. The temperature profile measuring instrument can in this case be formed from a plurality of stationary temperature measuring instruments or e.g. from one temperature measuring instrument transversely traversing the conveyance direction of the rolling stock; thermal cameras are also ideally suited to this purpose.

It is furthermore advantageous to measure a temperature $T_3$ of the heated and descaled rolling stock by means of a temperature measuring instrument prior to hot rolling and supply same to a controller, and for the controller to determine a control variable with the aid of a control law and taking into account a reference temperature $T_{3\ Ref}$ and supply said variable to a control element, with at least one inductor of the second induction furnace being driven such that the temperature $T_3$ of the heated rolling stock corresponds as closely as possible to the reference temperature $T_{3\ Ref}$. In this case the reference rolling temperature is reliably attained with a high degree of precision even at different strip speeds or under different operating conditions.

A further improvement is possible if not only a temperature but also a (continuous or discretized) temperature profile $T_3$ of the heated and descaled rolling stock is measured prior to hot rolling and supplied to a controller. With the aid of a control law and taking into account a reference temperature profile $T_{3\ Ref}$ the controller determines a control variable and supplies same to a control element, with at least one inductor of the second induction furnace being driven such that the temperature profile $T_3$ of the heated rolling stock corresponds as closely as possible to the reference temperature profile $T_{3\ Ref}$.

P, PI, PID or higher-quality controllers are suitable for example for all of the above-cited control processes. It is well-known to the person skilled in the art that other control laws (e.g. state controller, where appropriate with a state observer) can also be applied.

In order to prevent scale formation it is advantageous if the oxygen content of the largely inert protective gas atmosphere is held at <10% vol, preferably <2% vol. Typically, hydrogen, nitrogen, argon or else mixtures of these gases are used as the protective gas.

In a largely reducing protective gas atmosphere it is advantageous if the hydrogen content is held between 1 and 5% vol, preferably between 3 and 4.5% vol. In a preferred variant the inertization medium has an $N_2$ content of 95 to 99% vol, the inertization medium being supplied to the furnace chamber.

The object is furthermore achieved by means of an apparatus comprising:
    a first induction furnace for preheating the rolling stock to a temperature $T_1 \geq 1000°$ C., preferably $T_1 \geq 1050°$ C.;
    followed by
    a descaling device for descaling the preheated rolling stock by means of a plurality of water jets;
immediately followed by
    a second induction furnace having an inert or a reducing protective gas atmosphere for heating the descaled rolling stock to a temperature $1220°$ C.$\geq T_3 \geq 1050°$ C.;
    immediately followed by
    a rolling mill having at least three stands for hot rolling the heated rolling stock.

The apparatus according to the invention is characterized by a short overall installation length and low investment costs. This, combined with the high energy efficiency of the method, means that low overall costs per metric tonne of steel can be achieved together with a high product quality of the hot rolling stock.

It is advantageous if the descaling device includes at least one rotary descaling device in each case on the top and bottom side of the rolling stock.

It is furthermore advantageous if there is arranged between the first induction furnace and the descaling device a measuring instrument which is connected to a controller for the purpose of measuring a temperature or a temperature profile of the rolling stock, the controller being connected to at least one inductor of the first induction furnace.

It is also advantageous if there is arranged between the second induction furnace and the hot rolling mill a measuring instrument which is connected to a controller for the purpose of measuring a temperature or a temperature profile of the rolling stock, the controller being connected to at least one inductor of the second induction furnace.

In order to minimize the cooling-down of the preheated rolling stock after the first induction furnace it is beneficial if the distance between the outlet opening of the first induction furnace and the descaling device is max. 7 m, preferably max. 4 m.

It is furthermore favorable for the distance between the outlet opening of the second induction furnace and the roll gap of the first rolling stand of the hot rolling mill to be max. 7 m, preferably max. 4 m.

As an alternative to the last two embodiments or, as the case may be, possibly in addition thereto, it is advantageous to protect the rolling stock between the first induction furnace and the descaler, but also between the second induction furnace and the hot rolling mill, against temperature loss by means of a thermal hood.

In order to keep the operating costs of the plant to a minimum, and since the costs for the inertization medium of an induction furnace account for a significant portion of the operating costs per metric tonne of steel produced, it is advantageous if the first induction furnace has an air atmosphere. This means that only the inertization medium for the second induction furnace has to be provided.

It is particularly advantageous to arrange the apparatus according to the invention between the roughing train and the finishing train in the case of a combined casting/rolling plant for producing strip steel, e.g. in an ESP plant, or between the heatable coilbox and the finishing train in a combined ISP casting/rolling plant.

BRIEF DESCRIPTION OF THE DRAWINGS

Further advantages and features of the present invention will emerge from the following description of non-limiting exemplary embodiments, with reference being made to the accompanying schematic figures, in which.

DESCRIPTION OF THE EMBODIMENTS

Figure 1:
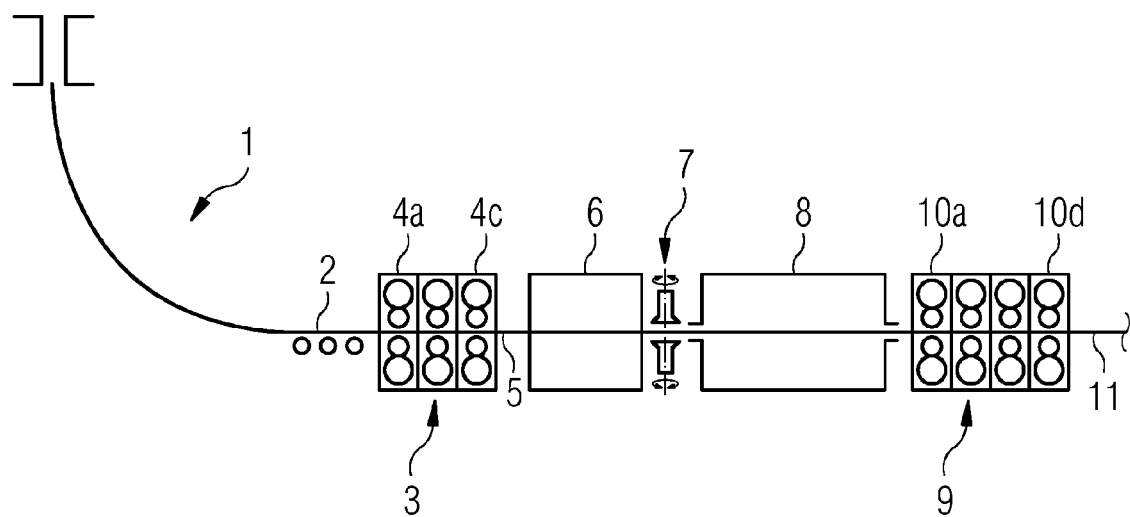
FIG. 1: shows a combined ESP casting/rolling plant for fully continuous production of hot strip with an apparatus for preparing rolling stock

FIG. 1 shows a combined casting/rolling plant for producing strip steel with a width of 2200 mm in a schematic representation. The plant comprises
- a continuous casting machine 1 for casting thin slabs 2, wherein the partially solidified strand exits the mold with a thickness of 80 mm;
- a strand guide (not shown in further detail) for liquid core reduction (LCR) or soft core reduction (SCR) of the thin slab in the strand guide to a thickness of 70 mm;
- an emergency shear (not shown) between the horizontal runout region of the continuous casting machine 1 and a roughing train 3;
- the roughing train 3 comprising three stands 4a, 4b, 4c for three-stage reduction of the thin slab to a rough strip 5 with a thickness of 13 mm, the rough strip exiting the roughing train at a temperature of 880° C.; followed by
- a first induction furnace 6 for preheating the rough strip in an air atmosphere, the preheated rough strip entering a downstream descaling device 7 at a temperature of $T_1=1080°$ C.;
- the descaling device 7, which consists of a plurality of rotor descalers on the top and bottom side of the rough strip in each case, wherein each descaler has eight individual nozzles and the water jets emitted from a descaler obliquely strike the surface of the rolling stock. As a result of the descaling the rolling stock is cooled down to a temperature of $T_2=1010°$ C.
- Directly after the descaling device 7 the rolling stock is heated by means of a second induction furnace 8 in an inert atmosphere consisting of 94% vol $N_2$, 5% vol $O_2$, and 1% vol other gases (Ar, Xe, Kr, CO, $CO_2$, $H_2$), with the result that upon exiting the second induction furnace 8 the rolling stock has a cross sectionally averaged temperature of 1160° C.
- Finally, the descaled and heated rolling stock is hot-rolled in a four-stand finishing train 9 through four reduction stages to a finished strip 11 with a thickness of 4 mm. For clarity of illustration reasons, the cooling, cutting to length and coiling of the finished strip have not been shown.

Figure 2:
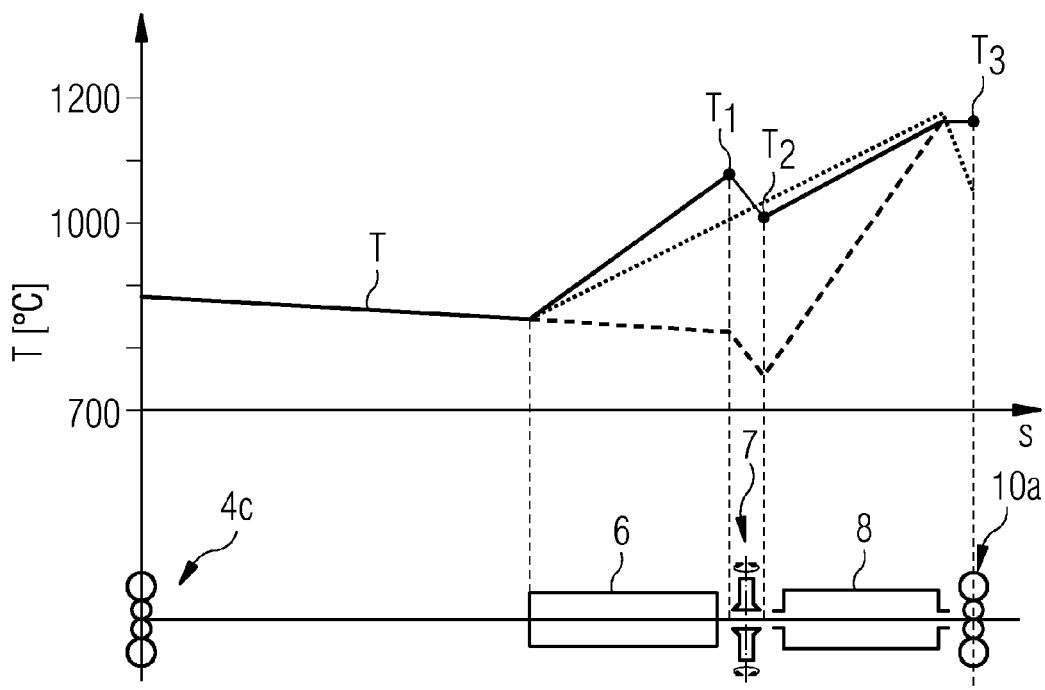
FIG. 2: shows an inventive temperature curve in relation to FIG. 1 and two schematic temperature curves according to the prior art

FIG. 2 shows the temperatures occurring during the method according to FIG. 1 in comparison with two embodiments according to the prior art. The curve of the temperatures according to the inventive method is shown as an unbroken line, while the curve of the temperatures according to a first prior art embodiment is shown as a dashed line. Said first embodiment according to the prior art represents a plant similar to FIG. 1, albeit with the difference that no preheating of the rough strip by means of a first induction furnace 6 takes place (see e.g. EP 1 951 451 B1). It is clearly evident from the diagram according to FIG. 2 that when entering the descaling device 7 the rolling stock now has a temperature of only 830° C., which means that thorough descaling of the rolling stock is no longer possible for all qualities of steel. Furthermore, according to the prior art the rolling stock is cooled as a result of the descaling to a temperature of 760° C., such that a phase transition from the ferromagnetic to the paramagnetic range of the rolling stock occurs in the second induction furnace 8. In contrast thereto, the preheating of the rolling stock to a temperature of 1080° C. in the first induction furnace 6 ensures that the rolling stock enters the descaling device at a temperature >1000° C.; following the descaling, the rolling stock still has a temperature of 1010° C., so the powerful second induction furnace 8 is operated at all times in the paramagnetic range of the rolling stock. Damage to the inductors is reliably prevented as a result, with a consequent positive effect on the reliability and service life of the inductors.

FIG. 2 also shows a second conventional method approach with dotted temperature curve as the prior art. This prior art embodiment represents a plant similar to FIG. 1, albeit with the difference that the rolling stock is heated only once by means of an induction furnace. From the diagram according to FIG. 2 it is clear that when entering the descaling device 7 the rolling stock has a temperature of 1180° C. The subsequent thorough descaling of the rolling stock up to the time of its entry into the finishing train leads to its being cooled down by 130 K in total. As a result of the descaling the rolling stock is therefore cooled down to a temperature of 1050° C. by the time it is fed into the first rolling stand. The overall energy loss due to the descaling is therefore considerably higher (almost twice as high) as in the case of the method according to the invention.

Figure 3:
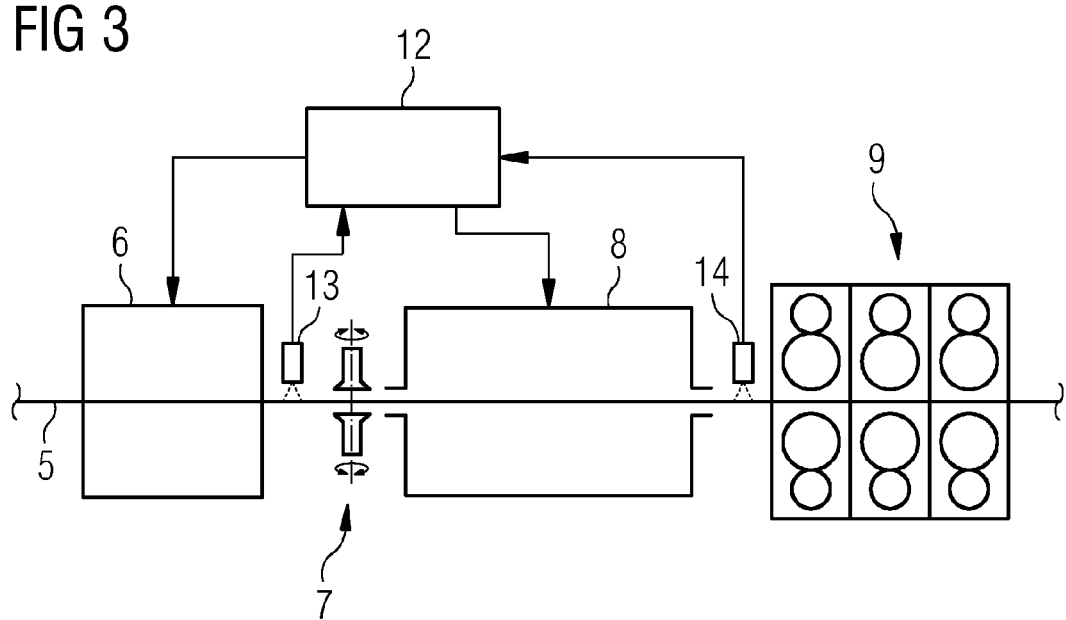
FIG. 3: shows an inventive control scheme

FIG. 3 shows an apparatus for preparing rolling stock, wherein, in addition to FIG. 1, a temperature measuring instrument 13 is arranged between the first induction furnace 6 and the descaling device 7 and a temperature profile measuring instrument 14 is arranged between the second induction furnace 8 and the hot rolling mill 9. Both instruments 13,14 are connected to a controller 12 which in each case drives the inductors of the first and second induction furnace. Accordingly, the controller 12 ensures that prior to the descaling the temperature of the preheated rolling stock corresponds to a first reference temperature $T_{1\_Ref}$ (generally >1000° C.) and prior to the hot rolling the temperature of the heated rolling stock corresponds to a second reference temperature $T_{2\_Ref}$ (generally between 1050 and 1250° C.). A particularly advantageous aspect of this embodiment is that the first induction furnace 6 only delivers the additional energy required for thoroughly descaling the rolling stock and the rolling stock is fed into the second induction furnace 8 at a temperature $>T_{Curie}$ (for steel, approx. 770° C.). Thus, little energy is introduced at higher speeds of the continuous casting machine or of the rough strip 5; if the speed of the casting or roughing process is slowed down, however, the rough strip 5 must be more strongly preheated accordingly.

Although not shown explicitly, a variant is also conceivable in which a further temperature measuring instrument is arranged between the descaling device 7 and the second induction furnace 8. In this case it is therefore possible to regulate the temperature in a targeted manner to the entry temperature into the second induction furnace.

Figure 4:
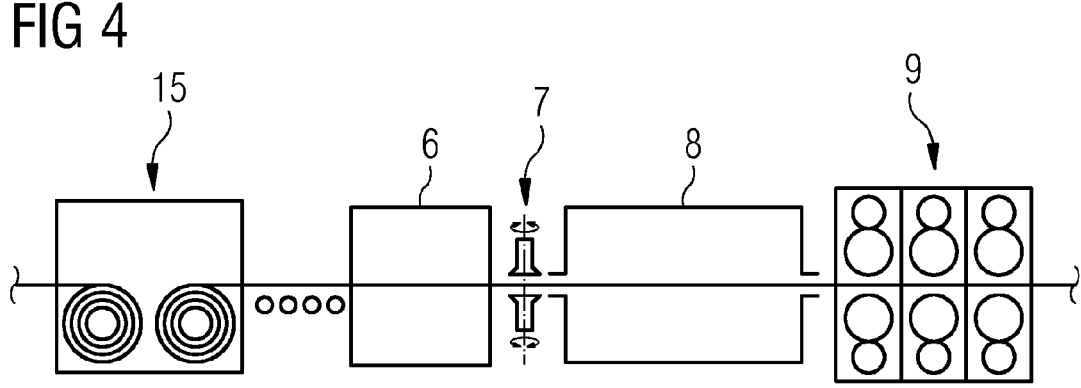
FIG. 4: shows a detail of a combined ISP casting/rolling plant for producing hot strip with an apparatus according to the invention

FIG. 4 shows the preparation of rolling stock in an ISP plant. In this case the hot strip is heated by means of a heatable coilbox 15 (the so-called Cremona box) and kept hot, and after downcoiling is supplied to the first induction furnace 6. Next, the hot strip is descaled in the descaling device 7 and heated to rolling temperature in the second induction furnace 8.

Figure 5:
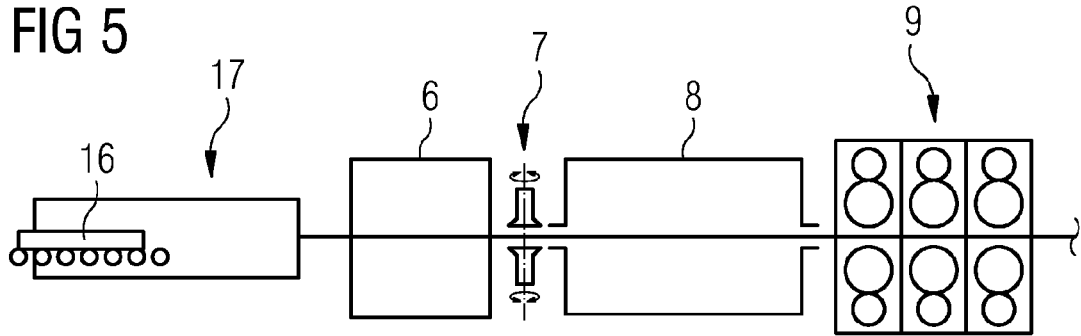
FIG. 5: shows a hot rolling train for hot rolling thin slabs with an apparatus for preparing rolling stock

FIG. 5 shows the preparation of rolling stock in a discontinuous rolling mill. In this variant the cold slabs 16 are first heated by means of a roller hearth furnace 17, it also being possible in this case to introduce slabs from an upstream multistrand continuous casting machine or a plurality of single-strand continuous casting machines (e.g. one two-strand or two single-strand machines) into the roller hearth furnace 17 and heat them there. The slabs 16 are subsequently introduced by means of drivable rollers firstly into the first induction furnace 6, preheated there, then descaled in the descaling device 7, heated to rolling temperature in the second induction furnace 8, and finally hot-rolled into a finished strip in the hot rolling mill 9.

Figure 6:
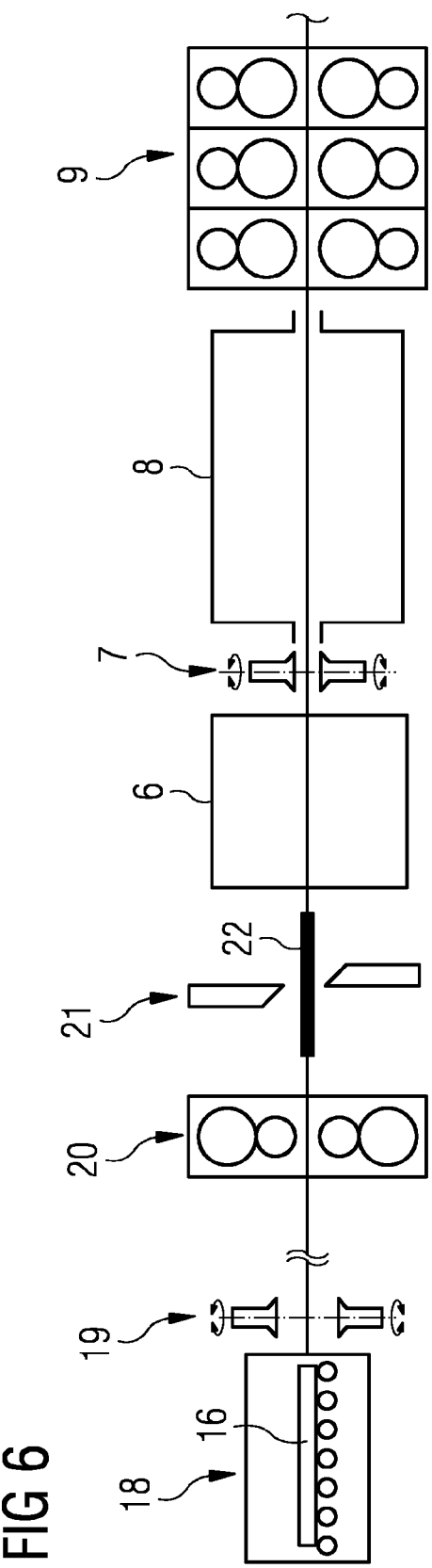
FIG. 6: shows a conventional hot rolling train for hot rolling slabs with an apparatus for preparing rolling stock

The use of the inventive method or apparatus for conventional hot rolling is illustrated in FIG. 6. As shown in the figure, a slab 16 with a thickness of 240 mm is in the process of being brought to a temperature of 1000° C. in a pusher hearth furnace 18 before being descaled directly after being heated by means of a primary descaling device 19 and rough-rolled in a reversing manner in a reversing stand 20 in five or seven passes. The intermediate strip 22 produced as a result of the roughing, having a thickness of 25 to 50 mm, preferably 30 to 45 mm, is cropped by means of a crop shear 21 before entering a first induction furnace 6 at an entry temperature of 850 to 950° C. The rolling stock is preheated in the first induction furnace 6 to a temperature of 1000 to 1050° C., subsequently descaled by means of the descaling device 7 and cooled down in the process to a temperature of 950 to 1010° C. Immediately thereafter the preheated and descaled rolling stock enters a second induction furnace 8, where it is heated to a temperature of 1050 to 1150° C. The rolling stock is then hot-rolled in a finishing train 9 before being spooled into coils. An advantageous aspect of the method according to the invention is that the pusher hearth furnace 18 is required to heat the slab to a much lower temperature of 1000° C. (compared with approx. 1200° C. according to the prior art), which means that the radiation losses—which are proportional to the fourth power of the temperature—can be dramatically reduced, with the result that the process as a whole can execute more energy-efficiently.

LIST OF REFERENCE SIGNS

1 Continuous casting machine
2 Thin slab
3 Roughing train
4a . . . 4c Roughing train stand
5 Rough strip
6 First induction furnace
7 Descaling device
8 Second induction furnace
9 Hot rolling train
10a . . . 10d Hot rolling train stand
11 Finished strip
12 Controller
13 Temperature measuring instrument
14 Temperature profile measuring instrument
15 Heatable coilbox
16 Slab
17 Roller hearth furnace
18 Pusher hearth furnace
19 Primary descaling device
20 Reversing stand
21 Crop shear
22 Intermediate strip
S Plant length
T Temperature of the rolling stock

The invention claimed is:

1. A method for preparing steel rolling stock before hot rolling of the stock, comprising the steps of:
    preheating the rolling stock in a first induction furnace having an air atmosphere, the preheating being such that the preheated rolling stock enters a descaling device downstream of the first induction furnace at a surface temperature of the stock $T_1 \geq 1000°$ C.;
    immediately subsequently descaling the preheated rolling stock by a plurality of water jets in the descaling device jetting water on the rolling stock;
    causing the descaled rolling stock to enter a second induction furnace at a rolling stock temperature $T_2 \geq T_{Curie}$, heating the descaled rolling stock in the second induction furnace in either a largely inert or a largely reducing protective gas atmosphere; and
    hot rolling the heated rolling stock in a rolling mill with at least three rolling passes, wherein the heated rolling stock enters the rolling mill at a temperature $1220°$ C.$\geq T_3 \geq 1050°$ C.

2. The method as claimed in claim 1, further comprising the descaling of the preheated rolling stock is by a plurality of rotating water jets, each jet issued from a rotor of a rotary descaling device.

3. The method as claimed in claim 1, further comprising:
    prior to the descaling step, measuring the temperature $T_1$ of the preheated rolling stock by a temperature measuring instrument and supplying the temperature measurement to a controller; and
    applying a control law to the controller and the controller taking into account a reference temperature $T_{1\_Ref}$, determining by the controller a control variable, supplying the control variable to a control element, driving at least one inductor of the first induction furnace by the control element such that the temperature $T_1$ of the preheated rolling stock corresponds as closely as possible to the reference temperature $T_{1\_Ref}$.

4. The method as claimed in claim 3, further comprising:
prior to the descaling step, measuring a temperature profile $T_1$ of the preheated rolling stock by a temperature profile measuring instrument;
supplying the temperature profile to a controller; and
applying a control law to the controller and the controller taking into account a reference temperature profile $T_{1\ Ref}$, determining by the controller a control variable and supplying the control variable to a control element, driving at least one inductor of the first induction furnace such that the temperature profile $T_1$ of the preheated rolling stock corresponds as closely as possible to the reference temperature profile $T_{1\ Ref}$.

5. The method as claimed in claim 1, further comprising:
prior to the hot rolling step, measuring the temperature $T_3$ of the heated rolling stock by a temperature measuring instrument;
supplying the temperature measurement to a controller; and
applying a control law to the controller and the controller taking into account a reference temperature $T_{3\ Ref}$, determining by the controller a control variable, supplying the control variable to a control element, driving at least one inductor of the second induction furnace by the control element such that the temperature of the heated rolling stock $T_3$ corresponds as closely as possible to the reference temperature $T_{3\ Ref}$.

6. The method as claimed in claim 5, further comprising:
prior to the hot rolling step, the measuring of a temperature profile $T_3$ of the heated rolling stock by a temperature profile measuring instrument;
supplying the temperature profile to a controller; and
applying a control law to the controller and the controller taking into account a reference temperature profile $T_{3\ Ref}$, determining by the controller a control variable and supplying the control variable to a control element, driving at least one inductor of the second induction furnace such that the temperature profile $T_3$ of the heated rolling stock corresponds as closely as possible to the reference temperature profile $T_{3\ Ref}$.

7. The method as claimed in claim 1, further comprising holding an oxygen content of the largely inert protective gas atmosphere at <10% vol.

8. The method as claimed in claim 1, further comprising holding a hydrogen content of the largely reducing protective gas atmosphere between 1 and 5% vol.

* * * * *